Patented May 13, 1947

2,420,631

UNITED STATES PATENT OFFICE 2,420,631

DIS-AZO DYES FOR COLOR PHOTOGRAPHY

George J. Taylor, Rochester, N. Y., assignor to Eastman Kodak Company, Rochester, N. Y., a corporation of New Jersey No Drawing. Application December 2, 1944, Serial No. 566,401. In Great Britain August 19, 1941

10 Claims. (Cl. 95—6)

This invention relates to substantive disazo dye compounds and to photographic elements comprising the same. This application is a continuation-in-part of my copending application Serial No. 454,905, filed August 15, 1942.

It is an object of my invention to provide disazo dye compounds. Another object is to provide photographic elements comprising such disazo compounds, especially photographic elements useful in color photography. Other objects will become apparent hereinafter.

The disazo dye compounds with which my invention is concerned have the following general formula:

wherein R—N=N— represents the residue of a member selected from the group consisting of a diazotized monocyclic aminoaryl nucleus of the benzene series and a diazotized aminonaphthalene nucleus, said member having a substituent selected from the group consisting of an acylamino group, a sulfonamido group, an alkoxyl group, a cyano group and a dialkylamino group, preferably in the ortho or para position to the azo (—N=N—) group, $R_1$—N=N— represents the residue of a diazotized member selected from the group consisting of a 1-amino-2,5-dialkoxybenzene and a 1-amino-2-alkoxynaphthalene and $R_2$ represents the residue of a member selected from the group consisting of a 2-acylamino-8-hydroxynaphthalene-6-sulfonic acid (including 2-benzoylamino - 8 - hydroxynaphthalene - 6 - sulfonic acid), a 2-acylamino-8-hydroxynaphthalene-3,6-disulfonic acid (including 2-benzoylamino-8-hydroxynaphthalene-3,6-disulfonic acid) and a 2-acylamino-6-hydroxynaphthalene-8-sulfonic acid (including 2 - benzoylamino - 6 - hydroxynaphthalene-8-sulfonic acid).

In accordance with my invention, photographic elements are prepared comprising a light-sensitive emulsion layer, e. g. a gelatino silver halide emulsion layer, the light-sensitive emulsion layer containing a substantially non-diffusing disazo dye of the above general formula. Such photographic elements are particularly useful in color photography processes, such as those disclosed in Christensen U. S. Patent 1,517,049, dated November 5, 1924. This Christensen patent describes a process for producing a dye image in which a dyed gelatin layer containing a silver image is treated with a solution of a strong reducing agent such as sodium hydrosulfite or stannous chloride. Such color photography processes can be referred to as bleach-out processes or silver-dye-bleach processes. Still other of these color photography bleach-out processes are described in Ehrenfried U. S. Patent 2,322,001, dated June 15, 1943, and in Morris U. S. Patent 2,326,055, dated August 3, 1943.

The disazo dye compounds employed in my photographic elements do not diffuse through set gelatin and therefore require no precipitating agent to prevent diffusion. Further, these disazo dyes possess desirable spectral absorption properties in gelatin, for three-color photography. For example, the disazo dyes containing acylamino, alkoxyl, cyano or dialkylamino groups in the first component give blue solutions in water, but in gelatin the color shifts to cyan (blue-green). The dyes containing a sulfonamido group in the first component yield magenta shades in gelatin. These disazo dye compounds can be employed not only as image dyes in photographic elements, but can also be employed under some circumstances as filter dyes.

In preparing photographic emulsion layers for bleach-out processes of color photography in accordance with my invention, these disazo dyes are advantageously incorporated in the emulsion layers in amounts of from about 2.5 grams to 25 grams of dye per 100 grams of gelatin. The emulsions are advantageously coated to give a dye concentration of from 0.15 to 1.5 grams of dye per square meter of emulsion surface. Photographic emulsions containing these disazo dyes as image dyes can be coated on a support in the usual manner and multi-layer color films can be prepared in the customary way. These disazo dyes can also be incorporated in gelatin layers which are not light-sensitive layers, and the gelatin layers be included in photographic elements such as those employed in color photographic processes.

The disazo dye compounds which I employ in practicing my invention can be prepared by diazotizing the monocyclic aminobenzene or aminonaphthalene nucleus defined hereinbefore, coupling the diazonium compound obtained with a 1-amino-2-alkoxynaphthalene or a 1-amino-2,5-dialkoxybenzene, diazotizing the monoazo dye thus formed and coupling the diazonium compound obtained with a 2-acylamino-8-hydroxynaphthalene-6-sulfonic acid, a 2-acylamino-8-hydroxynaphthalene-3,6-disulfonic acid, or a 2-acylamino - 6 - hydroxynaphthalene - 8 - sulfonic acid.

As first components that can be employed in the preparation of the disazo dye compounds of the invention may be mentioned p-aminoacetanilide, m-aminoacetanilide, p-anisidine, o-anisidine, p-aminobenzonitrile, o-dimethylaminoaniline, p-dimethylaminoaniline, o - aminobenzonitrile, 2-amino-5-acetaminobenzenesulfonic acid, 2 - acetamino - 5 - aminobenzenesulfonic acid, 1-amino - 4 - oxalylaminobenzene, 2 - oxalylamino-1-amino-4-oxalylaminobenzene, 2 - oxalylamino-5-aminobenzenesulfonic acid, 2-amino-5-oxalyl-aminobenzenesulfonic acid, 1-amino-4-propionyl-aminobenzene, 1-amino-4-butyryl aminobenzene, 1-amino-4-(N-methyl-N-acetyl-) aminobenzene, 1-amino - 4 - benzoylaminobenzene, 1 - amino-2-benzoylaminobenzene, N-(p-aminophenyl)-succinimide, N-(p-aminophenyl)-maleinimide

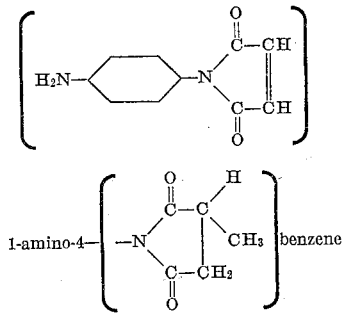

1 - (4'-aminophenyl) -3-methyl-5-pyrazolone, N-(p-aminophenyl) - 2 - pyrrolidone, 1 - amino - 4 - methylsulfonylaminobenzene

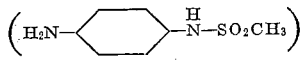

N-(phenylsulfonyl)-p-phenylenediamine, 1-amino - 4 - ethylsulfonyl-aminobenzene, 1 - amino-4-butylsulfonylaminobenzene, N-(p-toluenesulfonyl)-p-phenylenediamine, 1-amino-4-cetylsulfonylaminobenzene, 5-amino-2-propionylaminobenzenesulfonic acid, 5-amino-2-acetaminobenzenesulfonemethylamide, N-(p-aminophenyl)-phthalimide

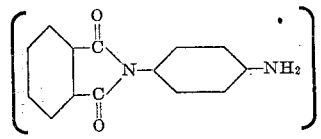

1-amino-2-ethylsulfonylaminobenzene, 1-amino-3-methylsulfonylaminobenzene,

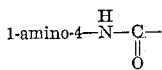

(butyl, amyl, hexyl, octyl, decyl or cetyl) benzene, 1-amino - 4 - acetaminonaphthalene, 1-amino-4-acetaminonaphthalene-6-sulfonic acid, 1-amino-4-acetaminonaphthalene-7-sulfonic acid, 1-amino - 4 - benzoylaminonaphthalene, 1 - amino - 4 - benzoylaminonaphthalene-6-sulfonic acid, 1-amino - 4 - benzoylaminonaphthalene - 7 - sulfonic acid and 1 - amino - 2 - p - toluenesulfonylaminonaphthalene.

Second components that can be employed include, for example, 1-amino-2-ethoxynaphthalene, 1-amino-2-ethoxynaphthalene - 6 - sulfonic acid, 1-amino-2-ethoxynaphthalene - 7 - sulfonic acid, 1-amino-2-methoxynaphthalene, 1-amino-2-propoxynaphthalene-6-sulfonic acid, 1-amino-2-butoxynaphthalene-7-sulfonic acid, 1-amino-2,5-dimethoxybenzene, 1-amino-2,5-diethoxybenzene, 1-amino-2,5-dipropoxybenzene, 1-amino-2-ethoxy-5-methoxybenzene and 1-amino-2,5-dibutoxybenzene.

Third components that can be employed include, for example, 2-(4''-amino-2'-benzamido)-8- hydroxynaphthalene - 6 - sulfonic acid, 2 - (4'-amino-benzamido)-8-hydroxynaphthalene - 6 - sulfonic acid, 2-benzoylamino-8-hydroxynaphthalene-6-sulfonic acid, 2-acetamino-8 - hydroxynaphthalene-6-sulfonic acid, 2 - propionylamino-8-hydroxynaphthalene - 6 - sulfonic acid, 2 - (4'-acetaminobenzamido) - 8 - hydroxynaphthalene-6-sulfonic acid, 2-(4''-acetamino-4-benzamido-benzamido) -8- hydroxynaphthalene-6-sulfonic acid, 2 - (2' - sulfo-4'-aminobenzamido) -8-hydroxynaphthalene- 6 -sulfonic acid and the corresponding N-benzoyl and N-acyl derivatives of 2-amino-8-hydroxynaphthalene-3,6-disulfonic acid and 2-amino-6-hydroxynaphthalene-8-sulfonic acid. It will be understood that other N-acyl derivatives can be employed in addition to those specifically named, as only the simpler and more common N-acyl derivatives have been given.

It will be apparent from the illustrative first components given hereinbefore that the term "acylamino group" refers broadly to groups containing a

linkage which are joined directly to the benzene nucleus through the nitrogen atom of the amino group. Both open chain and cyclic groups are included. Similarly the term "sulfonamido group" refers to groups containing a

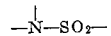

linkage which are joined directly to the benzene nucleus through the nitrogen atom of the sulfonamido group.

The following examples illustrate the preparation of the disazo dye compounds of the invention:

*Example 1*

37.5 grams (.25 gram mole) of p-aminoacetanilide are dissolved in 1000 grams of water and 60 grams of concentrated hydrochloric acid (specific gravity 1.18). The resulting solution is cooled to 10° C. and diazotized by adding, with stirring, 17.5 grams of sodium nitrite while maintaining the temperature at about 10° C. Stirring is continued for ½ hour after complete addition of the sodium nitrite at the end of which time the complete diazotization mixture is run into a suspension of 66.8 grams (.25 gram mole) of 1-amino-2-ethoxynaphthalene - 7 - sulfonic acid in 500 grams of water following which 50 grams of $CH_3COONa.3H_2O$ are added and stirring is continued for about 24 hours. The reaction mixture is then cooled to 10° C. and made alkaline by the addition of 280 grams of 10% aqueous sodium hydroxide following which it is diazotized with 35 grams of sodium nitrite and 90 grams of concentrated hydrochloric acid (specific gravity 1.18). Throughout the diazotization reaction the reaction mixture is stirred while maintained at a temperature of about 10° C. After completion of the diazotization reaction which requires about two hours, the diazotization product is salted out with sodium chloride, recovered by filtration, and placed in sufficient water at 0° C. to form a paste. This diazotization product is then coupled at a temperature of 10° C. with a solution of 120 grams (.25 gram mole) of 2-(4''-amino-4'-benzamidobenzamido) -8-hydroxynaphthalene - 6 - sulfonic acid in 300 grams of pyridine and 135 grams of an aqueous 28% ammonia solution. The reaction mixture resulting is stirred for 24 hours at the end of which time the dye compound formed is recovered by filtration. This dye compound may be purified by salting it out of a water solution with a salt such as sodium chloride. The dye obtained has in its free acid state, the formula:

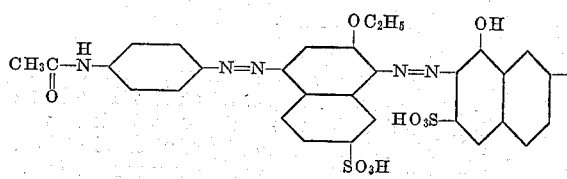

Example 2

0.25 gram mole of p-aminoacetanilide is diazotized and the diazonium compound obtained is coupled with 0.25 gram mole of 1-amino-2-ethoxynaphthalene-6-sulfonic acid and the monoazo dye thus obtained is in turn diazotized and coupled with 0.25 gram mole (90 grams) of 2-(4'-amino-benzamido)-8-hydroxynaphthalene-6-sulfonic acid. The dye compound obtained has in its free acid state the formula:

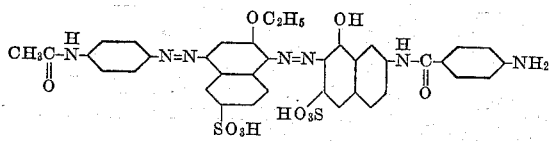

The diazotization, coupling and recovery operations necessary to the formation of the dye compound of this example can be carried out following the procedure described in detail in Example 1. The dye compound of this example is useful in the color photography process disclosed in the copending U. S. application of Robert A. Morris, Serial No. 446,054, filed June 6, 1942 (now U. S. Patent 2,326,055, dated August 3, 1943).

Example 3

0.25 gram mole of p-aminoacetanilide is diazotized and the diazonium compound obtained is coupled with 0.25 gram mole of 1-amino-2-ethoxynaphthalene-6-sulfonic acid and the monoazo dye thus obtained is in turn diazotized and coupled with 0.25 gram mole of 2-acetamino-8-hydroxynaphthalene-6-sulfonic acid. The dye compound obtained has in its free acid form the formula:

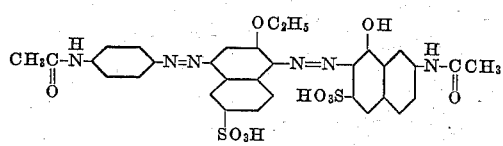

The diazotization, coupling and recovery operations necessary to the formation of the dye compound of this example can be carried out following the procedure described in detail in Example 1.

Example 4

7.8 grams of 1-amino-4-oxalylaminobenzene-2-sulfonic acid are dissolved in 50 grams of water and 24.5 grams of 10% aqueous sodium hydroxide. 2.1 grams of sodium nitrite dissolved in 20 parts of water are then added and the resulting solution is added slowly to 9.5 grams of concentrated hydrochloric acid (specific gravity 1.18) in 50 grams of water at 10° C. Stirring is continued for two hours at the end of which time the diazonium reaction mixture is run into a solution of 5.7 grams of 1-amino-2-ethoxynaphthalene in 100 grams of water and 3.7 grams of concentrated sulfuric acid (specific gravity 1.84) at 15° C. The reaction mixture is stirred for about 24 hours at the end of which time it is cooled to 10° C. and made alkaline by the addition of 78 grams of a 10% aqueous sodium hydroxide solution. Following this, the reaction mixture is diazotized with 5 grams of sodium nitrite and 33 grams of concentrated hydrochloric acid (specific gravity 1.18). The diazotization is complete in about two hours at which time the diazotization product is salted out with sodium chloride, filtered off and placed in enough water to form a paste at 0° C. This diazotization product is then coupled with a solution of 10.7 grams of 2-(4'-aminobenzamido)-8-hydroxynapthalene-6-sulfonic acid in 50 grams of pyridine and 23 grams of 28% aqueous ammonia at 10° C. The reaction mixture is stirred for 24 hours at which time the dye is filtered off and purified by salting out of a water solution by the addition of sodium chloride. The dye thus obtained corresponds in its free acid state to the formula:

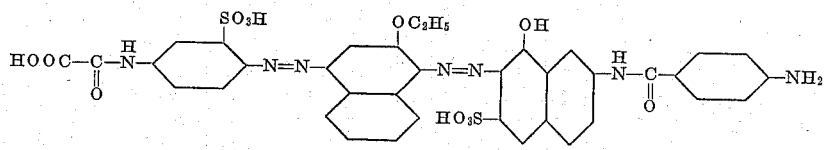

Example 5

0.25 gram mole of 1-amino-4-acetaminonaphthalene-7-sulfonic acid is diazotized and the diazonium compound obtained is coupled with 0.25 gram mole of 1-amino-2-ethoxynaphthalene-6-sulfonic acid and the monoazo dye thus obtained is in turn diazotized and coupled with 0.25 gram mole of 2-benzoylamino-8-hydroxynaphthalene-6-sulfonic acid. The dye compound obtained has in its free acid state the formula:

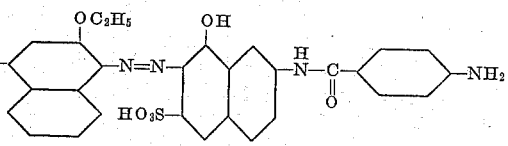

The diazotization, coupling and recovery operations necessary to the formation of the dye compound of this example can be carried out following the procedure described in detail in Example 4.

Example 6

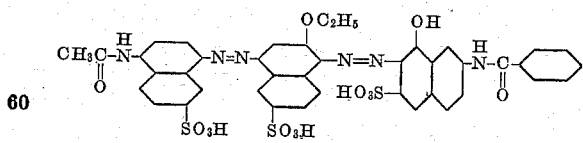

4.9 g. of p-anisidine were dissolved in 50 cc. of water and 10 cc. of concentrated hydrochloric acid (Sp. G. 1.18). The resulting solution was cooled to 0° C. and 3 g. of sodium nitrite in 15 cc. of water were added. The resulting solution was stirred for 30 minutes and then the excess nitrile was destroyed with sulfamic acid. The resulting diazonium salt solution was then added to a dispersion of 10.7 g. of 2-ethoxy-1-naphthylamine-6-sulfonic acid in 50 cc. of water. 10 g. of sodium acetate were added to the mixture and the whole was stirred for at least eight hours. The reaction mixture was then made alkaline with 10 per cent aqueous sodium hydroxide and then 6 g. of sodium nitrite in 30 cc. of water were added. The resulting dispersion was added slowly to 20 cc. of concentrated hydrochloric acid in 75 cc. of water, at 0° C. The whole was stirred for 2 hours. The 100 g. of sodium chloride were added and the whole was stirred for one hour. The resulting diazo salt was then filtered off and dispersed in 100 cc. of cold water. The resulting dispersion was added to a solution of 14.4 g. of N-(4'-aminobenzoyl)-γ-acid in 100 cc. of pyridine and 50 cc. of 28 per cent aqueous ammonia. The resulting mixture was stirred for 17 hours then heated on a steam bath for 5 minutes, cooled and the disazo dye filtered off. The disazo dye was purified by salting out from a water solution.

*Example 7*

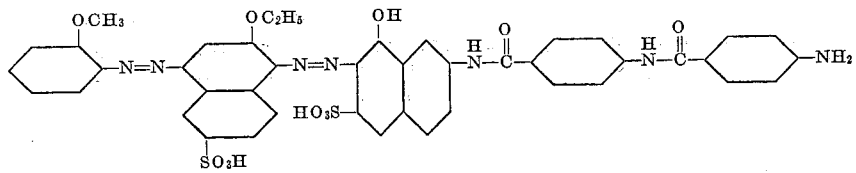

This dye was prepared exactly as in Example 6 employing 4.9 g. of o-anisidine instead of p-anisidine as the first component and 19.1 g. of N-(4''-amino-4'-benzamido-benzoyl)-γ-acid instead of N-(4'-aminobenzoyl)-γ-acid, as the third component. The second component was the same as that in Example 6, viz. 2-ethoxy-1-naphthylamine-6-sulfonic acid.

*Example 8*

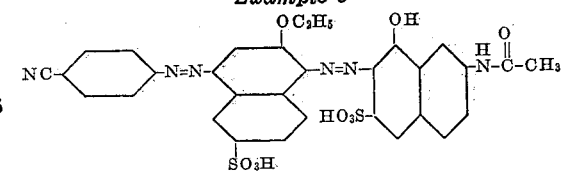

4.7 g. of p-aminobenzonitrile was dissolved in 125 cc. of water and 10 cc. of concentrated hydrochloric acid. The resulting solution was cooled to 15° C. and 3 g. of sodium nitrite in 15 cc. of water were added. The resulting mixture was cooled to 5° C. and stirred for one hour, whereupon the excess nitrite was destroyed with sulfamic acid. The remaining procedure was exactly the same as in Example 6, using 10.7 g. of 2-ethoxy-1-naphthylamine-6-sulfonic acid as the second component and 11.2 g. of N-acetyl-γ-acid, as the third component.

*Example 9*

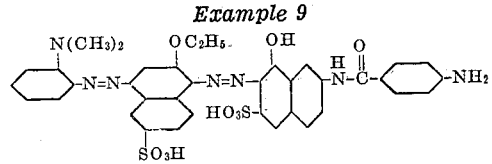

This dye was prepared exactly as in Example 6 using 5.4 g. of o-dimethylaminoaniline as the first component instead of p-anisidine.

The compounds whose formulae are given hereinafter can be prepared following the general procedure described and illustrated in the foregoing examples. When the first diazonium component contains a sulfonic acid group, the procedure described in Example 4 is ordinarily followed; if no sulfonic acid group is present, the general procedure described in Example 1 is employed.

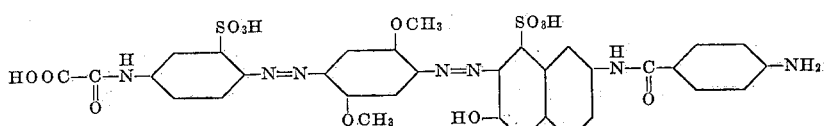

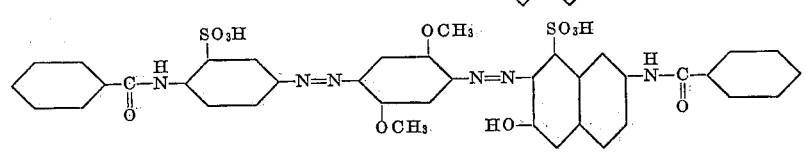

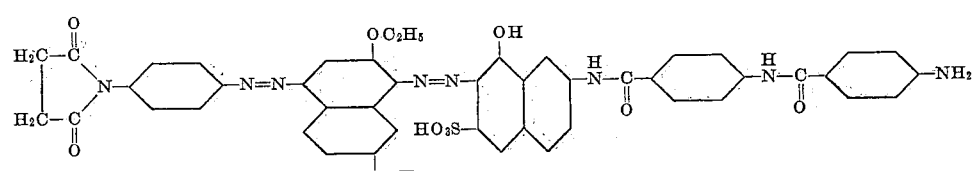

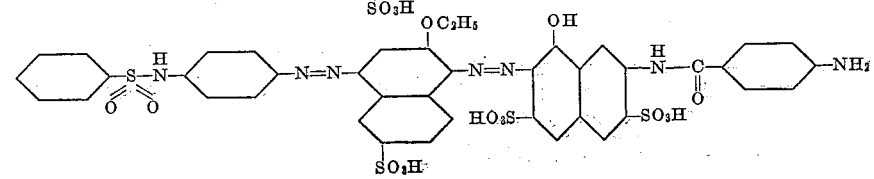

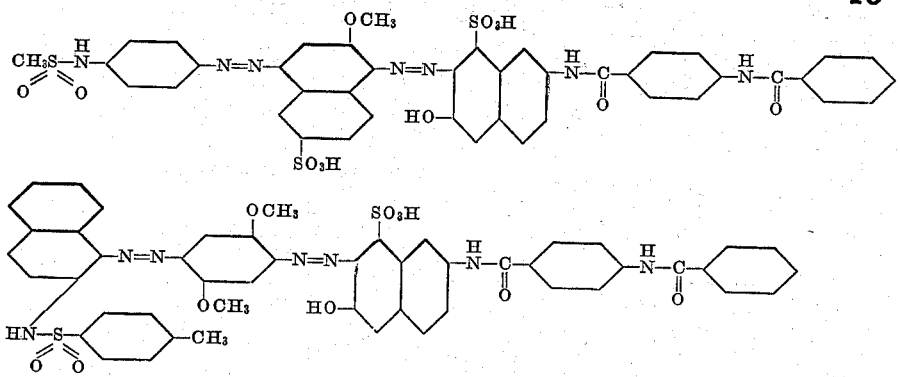

The following tabulation further illustrates the compounds of my invention. It will be understood that the components mentioned can be combined following the general procedure described in Examples 1 to 5, inclusive, or by variations of this procedure which are apparent to those skilled in the art to which this invention relates.

art for coloring these materials. When the disazo dye compounds are to be employed in color photography operations of the character indicated hereinbefore it will be understood that the manner of their employment is the same as described in the patents and applications referred to.

It will be understood that the term "benzoyl-

| First Component | Second Component | Third Component |
| --- | --- | --- |
| m-aminoacetanilide | 1-amino-2-ethoxynaphthalene-6-sulfonic acid. | 2-(4'-aminobenzamido)-8-hydroxynaphthalene-6-sulfonic acid. |
| N-(p-toluenesulfonyl)-p-phenylenediamine | do | Do. |
| 2-acetamino-5-amino-benzenesulfonic acid | do | Do. |
| 2-acetamino-5-amino-benzenesulfonmethyl-amide | do | 2-acetamino-8-hydroxynaphthalene-3,6-disulfonic acid. |
| N-(p-aminophenyl)-phthalimide | do | 2-acetamino-6-hydroxynaphthalene-8-sulfonic acid. |
| p-aminoacetanilide | 1-amino-2-ethoxynaphthalene-7-sulfonic acid. | 2-(4'-acetaminobenzamido)-8-hydroxynapthalene-6-sulfonic acid. |
| Do | do | 2-benzoylamino-8-hydroxynaphthalene-6-sulfonic acid. |
| Do | do | 2-acetamino-8-hydroxynaphthalene-6-sulfonic acid. |
| Do | do | 2-(4'-aminobenzamido)-8-hydroxynaphthalene-3,6-disulfonic acid. |
| Do | do | 2-(4'-amino-2'-sulfonic acid benzamido)-8-hydroxynaphthalene-6-sulfonic acid. |
| 1-(4'-aminophenyl)-3-methyl-5-pyrazolone | 1-amino-2-ethoxynaphthalene-6-sulfonic acid. | 2-(4'-aminobenzamido)-8-hydroxynaphthalene-6-sulfonic acid. |
| 1-(3'-aminophenyl)-3-methyl-5-pyrazolone | do | 2-(4'-acetaminobenzamido)-8-hydroxynaphthalene-6-sulfonic acid. |
| 1-(4'-aminophenyl)-3-carboxyl-5-pyrazolone | do | 2-(4'-acetaminobenzamido)-8-hydroxynaphthalene-3,6-disulfonic acid. |
| 1-(4'-aminophenyl)-3-carboxylic acid ethyl ester-5-pyrazolone | 1-amino-2-ethoxynaphthalene-7-sulfonic acid. | 2-(4'-aminobenzamido)-8-hydroxynaphthalene-6-sulfonic acid. |
| 1-(4'-aminophenyl)-3-phenyl-5-pyrazolone | do | 2-benzoylamino-6-hydroxynaphthalene-8-sulfonic acid. |
| 1-amino-4-acetaminonaphthalene | 1-amino-2-ethoxynaphthalene-6-sulfonic acid. | 2-(4'-aminobenzamido)-8-hydroxynaphthalene-6-sulfonic acid. |
| 1-amino-4-benzoylaminonaphthalene | do | 2-propionylamino-8-hydroxynaphthalene-6-sulfonic acid. |
| 1-amino-4-acetaminonaphthalene-6-sulfonic acid | 1-amino-2,5-dimethoxybenzene | 2-(4'-acetaminobenzamido)-8-hydroxynaphthalene-6-sulfonic acid. |
| 1-amino-4-benzoylaminonaphthalene-6-sulfonic acid | do | 2-acetamino-8-hydroxynaphthalene-3,6-disulfonic acid. |
| 1-amino-4-benzoylaminonaphthalene-7-sulfonic acid | 1-amino-2-ethoxynaphthalene-7-sulfonic acid. | 2-benzoylamino-8-hydroxynaphthalene-6-sulfonic acid. |
| 1-amino-2-p-toluenesulfonylaminonaphthalene | do | 2-propionylamino-6-hydroxynaphthalene-8-sulfonic acid. |

It will be understood that the disazo dye compounds specifically disclosed herein are intended to be illustrative and not limitative of my invention. Thus, within the teachings of the invention, the various components disclosed herein may be combined with one another to yield the new disazo dye compounds of the invention. To illustrate, p-aminoacetanilide in Example 1 can be replaced by an equivalent gram molecular weight of any of the other first components to obtain disazo dye compounds of the invention. That is, any first component can be replaced by any other first component, any second component can be replaced by any other second component and any third component can be replaced by any other third component.

When used to color wool and cotton, the disazo dye compounds of the invention can be applied to these materials by methods well known to the amino" as used herein and in the claims, unless otherwise indicated, includes not only the unsubstituted benzoylamino group but also substituted benzoylamino groups as has been indicated hereinbefore.

Dyes of the following general formula are especially useful in practicing my invention:

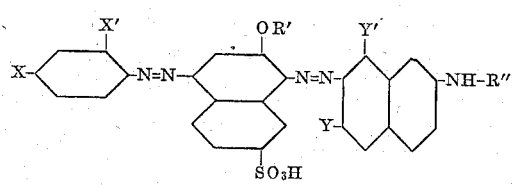

wherein X and X' each represents a member selected from the group consisting of hydrogen, a cyano group, an alkoxyl group, a dialkylamino group and an aliphatic acylamino group but X and X' do not represent hydrogen at the same time, R' represents an alkyl group, Y represents a member selected from the group consisting of a hydroxyl group and a sulfonic acid group but Y and Y' do not both represent a hydroxyl group at the same time and Y and Y' do not both represent a sulfonic acid group at the same time, and R'' represents an acyl group. R'' is advantageously an aliphatic acyl group when X or X' represents a cyano group. The alkyl groups referred to above are advantageously alkyl groups of from 1 to 4 carbon atoms and the alkoxyl groups are advantageously alkoxyl groups of from 1 to 4 carbon atoms. The X and X' groups are advantageously acylamino groups containing from 1 to 2 carbon atoms, and when they are, the R'' group is advantageously an aromatic acyl group.

I claim:

1. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series having a member selected from the group consisting of an acylamino group, an alkoxyl group, a cyano group, a dialkylamino group, and a sulfonamido group attached to its nucleus, $R_1$—N=N— represents the residue of a diazotized member selected from the group consisting of a 1-amino-2,5-dialkoxybenzene and a 1-amino-2-alkoxynaphthalene and $R_2$ represents the residue of a member selected from the group consisting of a 2-acylamino-8-hydroxynaphthalene-6-sulfonic acid, a 2-acylamino-8-hydroxynaphthalene-3,6-disulfonic acid and a 2-acylamino-6-hydroxynaphthalene-8-sulfonic acid.

2. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series containing an alkoxyl group attached to its nucleus in a position selected from the ortho and para positions to the azo bond which is joined to said benzene nucleus R, $R_1$—N=N— represents the residue of a diazotized 1-amino-2-alkoxynaphthalene-6-sulfonic acid and $R_2$ represents the residue of a 2-benzoylamino-8-hydroxynaphthalene-6-sulfonic acid.

3. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series containing a dialkylamino group attached to its nucleus in a position selected from the ortho and para positions to the azo bond which is joined to said benzene nucleus R, $R_1$—N=N— represents the residue of a diazotized 1-amino-2-alkoxynaphthalene-6-sulfonic acid and $R_2$ represents the residue of a 2-benzoylamino-8-hydroxynaphthalene-6-sulfonic acid.

4. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series containing a cyano group attached to its nucleus in a position selected from the ortho and para positions to the azo bond which is joined to said benzene nucleus R, $R_1$—N=N— represents the residue of a diazotized 1-amino-2-alkoxynaphthalene-6-sulfonic acid and $R_2$ represents the residue of 2-acetylamino-8-hydroxynaphthalene-6-sulfonic acid.

5. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series containing an alkoxyl group containing from 1 to 4 carbon atoms attached to its nucleus in a position selected from the ortho and para positions to the azo bond which is joined to said benzene nucleus R, $R_1$—N=N— represents the residue of a diazotized 1-amino-2-alkoxynaphthalene-6-sulfonic acid in which the alkoxy group contains from 1 to 4 carbon atoms and $R_2$ represents the residue of a 2-benzoylamino-8-hydroxynaphthalene-6-sulfonic acid.

6. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series containing a dialkylamino group in which each alkyl group contains from 1 to 4 carbon atoms attached to its nucleus in a position selected from the ortho and para positions to the azo bond which is joined to said benzene nucleus R, $R_1$—N=N— represents the residue of a diazotized-1-amino-2-alkoxynaphthalene-6-sulfonic acid in which the alkoxy group contains from 1 to 4 carbon atoms and $R_2$ represents the residue of a 2-benzoylamino-8-hydroxynaphthalene-6-sulfonic acid.

7. A gelatino silver halide emulsion layer for the bleach-out process of color photography uniformly colored with a disazo dye compound having the formula:

wherein R—N=N— represents the residue of a diazotized monocyclic aminoaryl nucleus of the benzene series containing a cyano group attached to its nucleus in a position selected from the ortho and para positions to the azo bond which is joined to said benzene nucleus R, $R_1$—N=N— represents the residue of a diazotized 1-amino-2-alkoxynaphthalene-6-sulfonic acid in which the alkoxy group contains from 1 to 4 carbon atoms and $R_2$ represents the residue of 2-acetylamino-8-hydroxynaphthalene-6-sulfonic acid.

8. A gelatino silver halide emulsion layer for the bleach-out process of color photography uniformly colored with the disazo dye compound represented by the following formula:

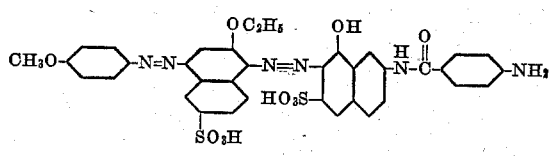

9. A gelatino silver halide emulsion layer for the bleach-out process of color photography uniformly colored with the disazo dye compound represented by the following formula:

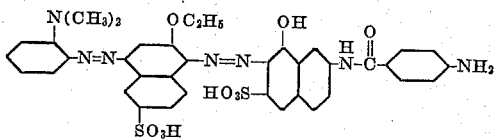

10. A gelatino silver halide emulsion layer for the bleach-out process of color photography uniformly colored with the disazo dye compound represented by the following formula:

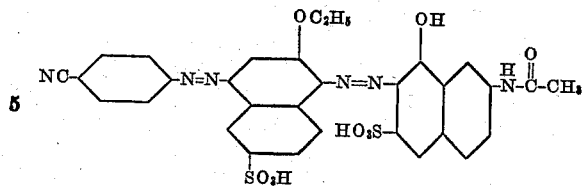

GEORGE J. TAYLOR.

REFERENCES CITED

The following references are of record in the file of this patent:

UNITED STATES PATENTS

| Number | Name | Date |
|---|---|---|
| 2,080,041 | Gaspar | May 11, 1937 |
| 2,125,015 | Gaspar | July 26, 1938 |
| 2,281,149 | Gaspar | Apr. 28, 1942 |
| 2,286,714 | Chechak | June 16, 1942 |
| 2,286,838 | Seymour et al. | June 16, 1942 |
| 2,286,837 | Seymour et al. | June 16, 1942 |

FOREIGN PATENTS

| Number | Country | Date |
|---|---|---|
| 496,559 | Great Britain | Nov. 30, 1938 |